United States Patent [19]

Aronne

[11] Patent Number: 4,583,522
[45] Date of Patent: Apr. 22, 1986

[54] SEQUENTIALLY PRESSURIZED FLIGHT SUIT

[75] Inventor: Armand Aronne, Massapequa, N.Y.

[73] Assignee: Grumman Aerospace Corporation, Bethpage, N.Y.

[21] Appl. No.: 528,567

[22] Filed: Sep. 1, 1983

[51] Int. Cl.[4] .............................................. A61H 1/00
[52] U.S. Cl. .................................. 128/1 A; 128/24 R; 128/40; 2/2.1 A
[58] Field of Search .................. 128/1 A, 25 R, 24 R, 128/38, 40; 2/2.1 A

[56] References Cited

U.S. PATENT DOCUMENTS

| | | | |
|---|---|---|---|
| 3,288,132 | 11/1966 | Meredith | 128/24 R |
| 3,412,730 | 11/1968 | MacLeod | 128/40 |
| 3,792,426 | 2/1974 | Ravenelle et al. | 2/2.1 A |
| 3,885,554 | 5/1975 | Rockwell, Jr. | 128/24 R |

Primary Examiner—Henry J. Recla
Attorney, Agent, or Firm—Richard G. Geib; Daniel J. Tick; Bernard S. Hoffman

[57] ABSTRACT

A valving system and modified anti-G flight suit are disclosed which operate in either of two modes. In an anti-blackout mode, pneumatic bladders in the flight suit are simultaneously inflated. In an anti-fatigue mode, the bladders are sequentially inflated in a repeated cycle so as to prevent pooling of blood and other body fluids in the leg and lower seat area.

11 Claims, 2 Drawing Figures

SEQUENTIALLY PRESSURIZED FLIGHT SUIT

BACKGROUND OF THE INVENTION

The present invention relates in general to flight suits, particularly to flying suits incorporating pneumatic bladders for applying pressure to specific areas on a person wearing the suit.

It is well known that forces resulting from aircraft maneuvers can have a pronounced effect on the blood circulation of the aircraft occupants. This effect is manifested by the "blackout" experienced by pilots of high speed military aircraft when performing banked turns or pulling out of dives. The forcing of blood away from the pilot's head at such times can temporarily cause a partial or complete loss of vision or even unconsciousness.

The foregoing problem has been addressed by numerous prior art flying suits; examples may be found in U.S. Pat. Nos. 2,379,497; 2,495,316; and 2,760,484; issued, respectively to Sellmeyer; Clark et al; and Ferwerda.

In the Sellmeyer flying suit, an inner lining and dividing webs define a plurality of air chambers surrounding the limbs and abdomen of the wearer. Air introduced at the wrists and ankles causes sequential pressurization of adjacent chambers, producing a progressive massaging effect on the wearer's circulatory system.

A similar arrangement is proposed in Clark et al; however, the design is greatly simplified, employing fewer air chambers and dispensing with the flap valves proposed by Sellmeyer. Significantly, Clark et al include bladders only at the thighs, calves and abdomen, recognizing that interruption of blood flow to the head is best stemmed by applying pressure at these points.

In Ferwerda, pressure bladders are located over the same key circulation points taught by Clark et al. A further refinement taught by Ferwerda is the use of three separate inlet conduit corresponding to the thigh, calf, and pelvic bladders. The pressure to each area is individually adjustable by means of separate pressure regulation valve means connected to each inlet conduit to the suit.

The use of separate inlet conduits to pressure chambers in a device for aiding blood circulation has been suggested for the treatment of vascular problems in general, as in U.S. Pat. No. 2,781,041, issued to Weinberg. In contrast to Ferwerda, the valving system taught by Weinberg allows control over the pressurization timing and sequencing, rather than the ultimate pressure, of each individual air chamber.

Pressurization of air bladders in prior art flying suits is typically controlled by an acceleration responsive valve which automatically opens when forces are such as may cause blackout. On long flights, however, for example with in-flight refueling, a pilot may be unable to leave his seat for extended periods of normal flight (i.e., no blackout acceleration condition). During such periods, there exists a potential for lower seated surface and lower extremity numbness due to blood pooling and unchanged pressure points. This problem has not heretofore been addressed by prior art flying suits and valving systems.

SUMMARY OF THE INVENTION

It is, therefore, a major objective of the present invention to provide a flight suit which performs its normal function of inflating when the aircraft undergoes abnormal acceleration, while, at the option of the wearer, operating at other times in an anti-fatigue mode.

Another object of this invention is to provide a flying suit which may be constructed with minimal modifications to existing garments.

Still another object is to provide a valving system for a flight suit which is adaptable to existing aircraft flight suit pressurizing systems.

In accordance with the present invention, an existing flight suit with a single inlet conduit to thigh, calf and pelvic bladders is modified by providing a separate inlet for the thigh bladders, another for the calves, and a third inlet for the pelvic bladder. A valving system for the modified suit includes three outlet ports corresponding to the inlet conduits and an inlet port connectible with an existing air pressure source in the aircraft.

The valving system of the present invention includes, in addition to an acceleration responsive valve, a plurality of valves responsive to a control timer, each such valve controlling the pressure to one of the modified flight suit inlet conduits. The object of providing an anti-fatigue operation mode is accomplished by programming the control timer to sequentially open the valves to the inlet conduits in a predetermined cycle. In the anti-blackout mode, the acceleration responsive valve provides an override signal to the control timer, causing the individual valves to each inlet conduit to be by-passed and all of the bladders to be inflated to the same pressure at once.

The modified flight suit of the present invention may be used without the valving system, if desired, in the anti-blackout mode only, by use of a simple adapter for connecting the multiple inlet conduits with the single air pressure source.

BRIEF DESCRIPTION OF DRAWINGS

A better understanding of the present invention may be had with reference to the appended drawings, in which.

DETAILED DESCRIPTION OF PREFERRED EMBODIMENT

Figure 1:
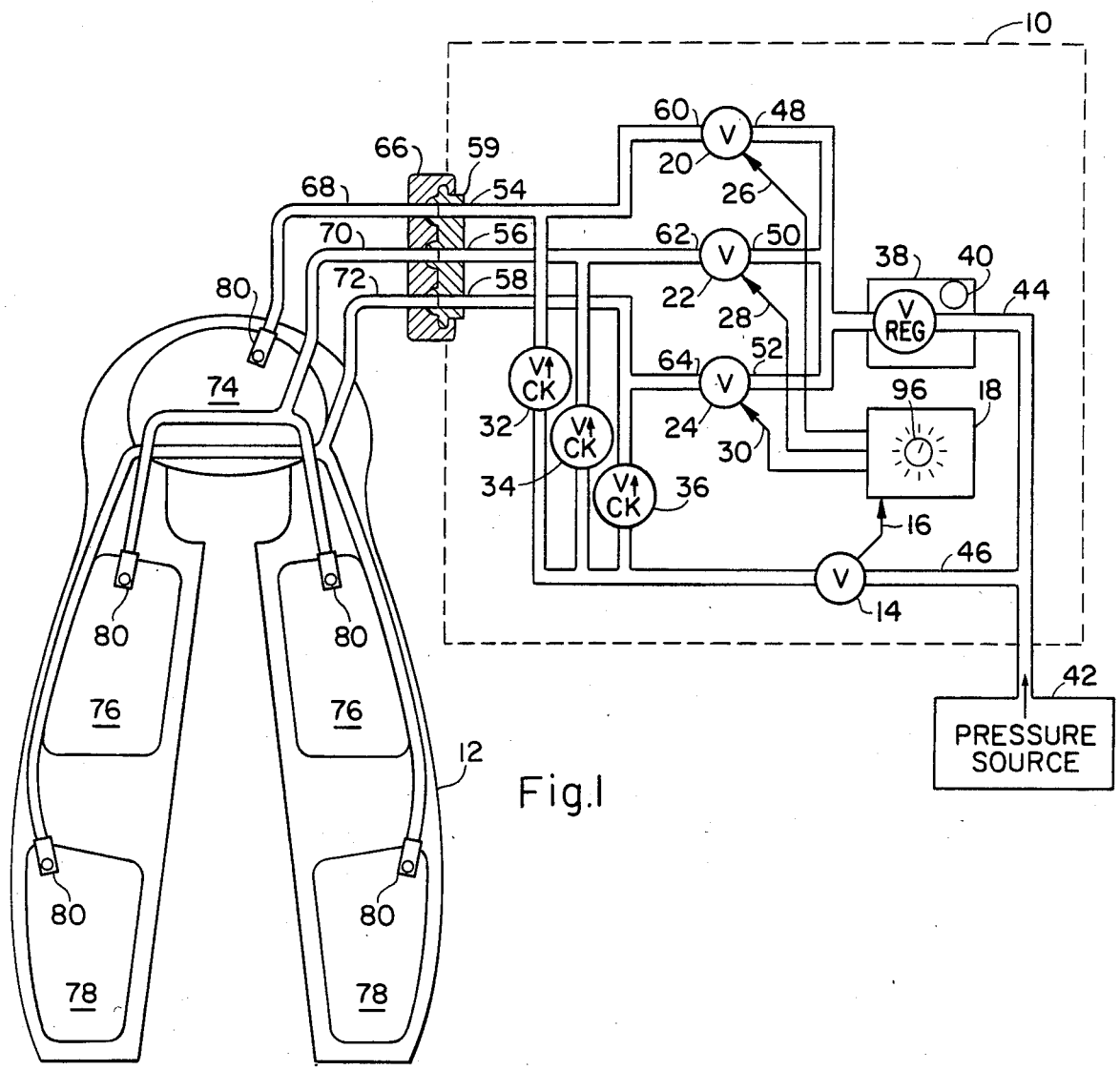
FIG. 1 is a schematic drawing of a valving system and flight suit embodying the present invention.

Referring to FIG. 1, a valving system 10 and flight suit 12 are shown in schematic form. Included in valving system 10 is an acceleration responsive (anti-G) valve 14 which opens in response upward forces on the wearer of suit 12 exceeding a predetermined limit. An override signal 16 indicates whether valve 14 is open or closed.

Also included in system 10 is an anti-fatigue control timer 18 responsive to override signal 16. Sequencing valves 20, 22 and 24 are controlled by timer 18, as indicated by signals 26, 28 and 30. Associated with valves 20, 22 and 24 and anti-G valve 14 are three check valves 32, 34 and 36. Also associated with valves 20, 22 and 24 is a pressure regulator 38, adjustable as indicated by knob 40 to control pressure to the sequencing valves.

As shown, the valving system 10 is connected to a pneumatic pressure source 42 such as may be found in existing aircraft with anti-G valves similar to valve 14. Both the anti-G valve 14 and regulator 38, as indicated by hoses 44 and 46, are connected to source 42. The output from anti-G valve 14, is connected to check valves 32, 34 and 36. The output from regulator 38 is connected to inlet ports 48, 50 and 52, respectively, of valves 20, 22 and 24. Three pressure outlets 54, 56, and 58 from valving system 10 are mounted on a common fitting 59. As shown, outlet 54 is connected to check valve 32 and outlet port 60 of valve 20; outlet 56 to check valve 34 and outlet port 62 of valve 22: and outlet 58 to check valve 36 and outlet port 64 of valve 24.

Included on flight suit 12 is fitting 66 corresponding to fitting 59 for connecting outlets 54, 56 and 58 from valving system 10 to inlet conduits 68, 70 and 72, respectively, in suit 12. As shown, each of the inlet conduits in suit 10 is connected to one or more air bladders fixed within the suit. Alternative, a separate garment for the air bladders may be worn over a flight suit.

Preferably, three systems of air bladders are employed. Thus, a pelvic bladder 74 is connected to inlet conduit 68, thigh bladders 76 to conduit 70, and calf bladders 78 to conduit 72.

Figure 2:
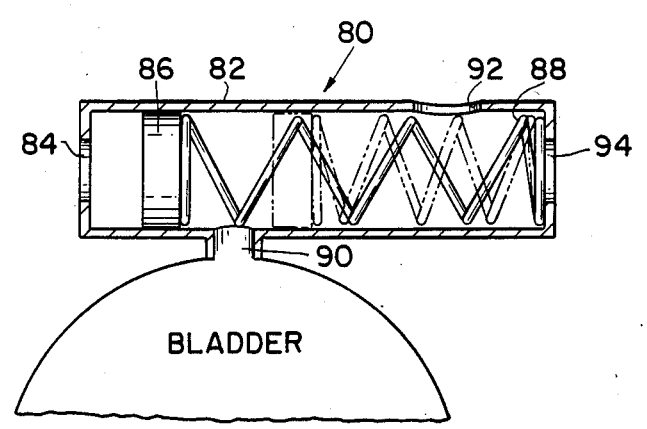
FIG. 2 is a cross section view of a vent valve used in the present invention.

FIG. 2 shows a preferred bladder input/venting valve 80. One such valve 80 is included on each bladder 74, 76 and 78 for connecting the bladder to its associated inlet conduit.

As shown, input/venting valve 80 includes a rigid tube 82 connected at opening 84 to the associated inlet conduit pressure source. A plunger 86, slidably disposed in tube 82, is forced toward opening 84 as by a spring 88. An opening 90 in the side of tube 82 communicates with the associated bladder, while a second side opening 92 located at a greater distance from the end opening 84 communicates with the surrounding atmosphere. A second end opening 94 also communicates with the surrounding air.

Two modes of operation are provided by the preferred embodiment of the present invention described above. During periods of normal flight, anti-G valve 14 remains closed, and timer 18 causes valves 20, 22 and 24 to open and close in a predetermined sequence. Air at a pressure controlled by regulator 38 is thus delivered to the flight suit inlet conduits 68, 70 and 72. As each inlet conduit is thus pressurized, the associated bladders are inflated through input/venting valves 80. Pressure entering opening 84 in the valve 80 causes plunger 86 to be forced back, as shown by the dotted lines in FIG. 2, allowing air to enter the bladder through opening 90. Upon closing of the associated sequencing valve, pressure on plunger 86 is released and plunger 86 returns to its solid line (FIG. 2) position, allowing air in the bladder to be vented out through openings 92 and 94.

It has been found that sequential inflation of the calf bladders, then the thigh bladders, and finally the pelvic bladder, in a repeated cycle, at a somewhat lower pressure than normally used for anti-blackout operation, effectively prevents pooling of blood in the lower leg and seat area. Timer 18 is thus preferably arranged to activate valves 24, 22 and 20 in order, with provision for control over the total sequencing period as indicated by knob 96. The wearer is thus permitted to select an anti-fatigue mode for maximum personal comfort, by adjusting the pressure delivered by regulator 38 and the sequencing period controlled by timer 18.

Abnormal acceleration causes operation to commence in an anti-blackout mode, initiated by the opening of anti-G valve 14 and assertion of override signal 16. Thus, in the anti-blackout mode, valves 20, 22 and 24 are closed, and inlet conduits 68, 70 and 72 are pressurized simultaneously through check valves 32, 34 and 36.

It will be appreciated by those skilled in the art that various modifications of the above described embodiment may be made. By making both pressure regulator 38 and timer 18 responsive to override signal 16, a sequential calf-thigh-pelvis anti-G pressurization may be effected through the sequencing valves. Such a modification would require appropriate logic in timer 18 to insure that once each sequencing valve is opened while operating in the anti-G mode, the valve remains open until override signal 16 is cleared. Another possible modification is the incorporation of a second set of interconnected bladders for connection to existing aircraft seat heating and cooling air.

Since these and other additions and modifications may suggest themselves to those skilled in the art, the scope of the present invention is to be interpreted only by the claims which follow.

What is claimed is:

1. In combination with a flight suit having pneumatic bladders for applying pressure to desired areas on a person wearing the flight suit, a plurality of inlet conduits, each bladder communicating with one of said plurality of inlet conduits. a device for pressurizing the bladders in a desired sequence, said device comprising:
   a plurality of sequencing valves in one-to-one correspondence with the inlet conduits, each sequencing valve including an inlet port and an outlet port;
   first connecting means for connecting the outlet port of each sequencing valve to a corresponding inlet conduit;
   timing control means for providing control signals to the sequencing valves in accordance with the desired sequence for pressurizing the bladders; and
   second connecting means for connecting the inlet ports to a pneumatic pressure source.

2. The device of claim 1 in which the second connecting means comprises a pressure regulator adjustable by the person wearing the flying suit.

3. The device of claim 1 which further comprises third connecting means for connecting the inlet conduits to the pneumatic pressure source.

4. The device of claim 3 in which the third connecting means comprises an anti-G valve which opens in response to an acceleration force on the person wearing the flying suit exceeding a predetermined limit.

5. The device of claim 4 in which the timing control means is responsive to an override signal from the anti-G valve, the sequencing valves being closed when the override signal is asserted, the override signal being asserted when the anti-G valve is open.

6. A sequentially pressurized flight suit comprising:
   a flight suit garment having pneumatic bladders for applying pressure to desired areas on a person wearing the garment and a plurality of inlet conduits, each bladder communicating with one of said plurality of inlet conduits in the garment;
   a plurality of sequencing valves in one-to-one correspondence with the inlet conduits, each sequencing valve including an inlet port and an outlet port:
   first connecting means for connecting the outlet port of each sequencing valve to a corresponding inlet con- duit;
   timing control means for providing control signals to the sequencing valves in accordance with a desired sequence for pressurizing the bladders; and
   second connecting means for connecting the inlet ports to a pneumatic pressure source.

7. The device of claim 6 in which the second connecting means comprises a pressure regulator adjustable by the person wearing the garment.

8. The device of claim 7 which further comprises third connecting means for connecting the inlet conduits to the pneumatic pressure source.

9. The device of claim 8 in which the third connecting means comprises an anti-G valve which opens in response to an acceleration force on the person wearing the garment exceeding a predetermined limit.

10. The device of claim 9 in which the timing control means is responsive to an override signal from the anti-G valve, the sequencing valves being closed when the override signal is asserted, the override signal being asserted when the anti-G valve is open.

11. The device of claim 10 in which each bladder comprises an inlet/venting valve which allows the bladder to be inflated in response to pneumatic pressure in the associated inlet conduit exceeding a predetermined pressure and vents air out of the bladder when the pneumatic pressure is below the predetermined pressure.

* * * * *